US006540970B1

(12) United States Patent
Strohmaier et al.

(10) Patent No.: US 6,540,970 B1
(45) Date of Patent: Apr. 1, 2003

(54) METHOD FOR THE SYNTHESIS OF MOLECULAR SIEVES

(75) Inventors: Karl G. Strohmaier, Port Murray, NJ (US); David E. W. Vaughan, Flemington, NJ (US)

(73) Assignee: Exxon Mobil Chemical Patents, Inc., Houston, TX (US)

( * ) Notice: Subject to any disclaimer, the term of this patent is extended or adjusted under 35 U.S.C. 154(b) by 321 days.

(21) Appl. No.: 09/705,352

(22) Filed: Nov. 3, 2000

Related U.S. Application Data
(60) Provisional application No. 60/166,118, filed on Nov. 18, 1999.

(51) Int. Cl.$^7$ .......................... C01B 37/06; C01B 37/08
(52) U.S. Cl. .............................. 423/306; 423/DIG. 30; 502/208; 502/214
(58) Field of Search ................................. 423/305, 306, 423/DIG. 30; 502/208, 214

(56) References Cited

U.S. PATENT DOCUMENTS

| | | | |
|---|---|---|---|
| 4,440,871 A | 4/1984 | Lok et al. ................... 502/214 |
| 4,692,424 A | 9/1987 | Le Van Mao ................. 502/68 |
| 4,913,799 A | 4/1990 | Gortsema et al. ............. 208/89 |
| 5,248,647 A | 9/1993 | Barger ........................ 502/214 |
| 5,300,277 A | 4/1994 | Kresge et al. | |
| 5,624,104 A | 4/1997 | Hukuda et al. ............... 267/34 |
| 5,849,968 A | 12/1998 | Heyse et al. ................. 585/483 |
| 5,962,762 A | 10/1999 | Sun et al. .................... 585/640 |
| 6,004,898 A | 12/1999 | Sun ............................ 502/214 |
| 6,162,415 A | * 12/2000 | Liu et al. ..................... 423/706 |
| 6,303,534 B1 | * 10/2001 | Strohmaier et al. ......... 502/214 |

FOREIGN PATENT DOCUMENTS

| | | | |
|---|---|---|---|
| EP | 0185525 | 12/1985 | ........... C01B/33/28 |
| EP | 0391774 | 10/1990 | ........... C01B/33/34 |
| EP | 0166520b1 | 2/1991 | ........... C01B/25/45 |
| EP | 0541915 | 7/1996 | ........... C07C/11/02 |
| WO | WO89/01912 | 3/1989 | ........... C01B/25/36 |
| WO | WO99/19254 | 4/1999 | ........... C01B/37/08 |
| WO | WO99/61372 | 12/1999 | ........... C01B/37/08 |

OTHER PUBLICATIONS

Barthomeuf, D., "Topology and Maxiumu Content of Isolated Species (Al, Ga, Fe, B, Si, . . .) in a Zeolitic Framework. An Approach to Acid Catalysis," *J. Phys. Chem.*, 97, 1993, pp. 10092–10096.

Flanigen, et al "Aluminophosphate molecular Sieves and the Periodic Table," Union Carbide Corporation, Tarry town Technical Center, Tarrytown, New York, 10591 USA (No Date Available).

Barthomeuf, D., "Topogical Model for the Compared Acidity of SAPOs and SiAl Zeolites," *Zeolites*, vol. 14, Jul./Aug., 1994.

Tusar, et al., "A Zinc–Rich CHA–Type Aluminophosphate," *Zeolites*, 15, 1995, pp. 708–713.

\* cited by examiner

*Primary Examiner*—David Sample

(57) ABSTRACT

The present invention provides a method for the synthesis of MeAPO molecular sieves which includes the following steps: providing a source of alumina, a source of phosphorus, water, and a template suitable for forming a MeAPO molecular sieve; providing a source of metal (Me) including metal particles, the metal particles measuring, in their largest dimension, equal to or less than five nanometers; providing a water soluble organic solvent capable of solubilizing the source of metal; forming a synthesis mixture from the source of alumina, the source of phosphorus, the water, the template, the source of metal, and the solvent; and forming a MeAPO molecular sieve from the synthesis mixture.

38 Claims, 3 Drawing Sheets

METHOD FOR THE SYNTHESIS OF MOLECULAR SIEVES

This application claims the benefit of Provisional application Ser. No. 60/166/118, filed Nov. 18, 1999.

FIELD OF THE INVENTION

The present invention relates to a method for the synthesis of metalloaluminophosphate (MeAPO) molecular sieves and particularly to a process for the synthesis of silicoaluminophosphate (SAPO) molecular sieves.

BACKGROUND OF THE INVENTION

Methods for the preparation of metalloaluminophosphates, such as MeAPSOs, ElAPSOs, and MeAPOs are known in the art and are members of a class known as non-zeolitic molecular sieves. (See E. M. Flanigen, B. M. Lok, R. L. Patton, S. T. Wilson, *New Developments in Zeolite Science and Technology*, Y. Murakemi et al. eds., Elsevier, Amsterdam, p. 103(1986)). These non-zeolitic molecular sieves are referred to herein as MeAPO molecular sieves and have frameworks of $AlO_4$, $MeO_x$ and $PO_4$ tetrahedra linked by oxygen atoms. A negative change in the framework is balanced by the inclusion of exchangeable protons or cations such as alkali or alkaline earth metal ions. The interstitial spaces of channels formed by the crystalline framework enables MeAPOs to be used as molecular sieves in a manner similar to aluminosilicate molecular sieves, such as, for example, zeolites.

Accordingly, numerous microporous framework structures analogous to the aluminosilicate zeolites can be synthesized having an $AlPO_4$ composition and have been called ALPOs. A modified family of materials has been made by the substitution of a metal (Me) for $Al^{3+}$ and $P^{5+}$ to form the above referenced metals. Although the ALPO structures are neutral frameworks, the substitution of $M^{a+}$ for $P^{5+}$ imparts a negative charge on the framework when 'a' is less than 5. By suitable choice of a cation, this can be translated into catalytic activity. However, alternate substitutions may be possible that may result in a disproportionately low exchange capacity. The exact nature of Me substitution into ALPO structures is complex and highly variable and may depend on both the topology of the ALPO/MeAPO and the method of preparation. (See D. Barthomeuf, *J. Phys. Chem.*, 97, p. 10092 (1993) and D. Barthomeuf, *Zeolites*, 14, p. 394 (1994)). The result is that preferred catalysts may be made by a suitable choice of synthesis method.

Because the distribution of Me in the MeAPO framework affects catalytic activity, the catalytic activity of MeAPOs therefore depends on both the global composition and the Me distribution. This has been bet demonstrated for $Si^{4+}$ on the basis of this NMR techniques. It has been shown for some substitutions that when MeAPOs contain low amounts of the Me, the metal atoms are mostly isolated. However, when the Me content increases, islands of the metal may start to appear, i.e., Me sites having metal atoms and no aluminum or phosphorus atoms in neighboring lattice positions. These metal islands result in a loss of catalytic activity of the molecular sieve, and increase the cost of the catalyst when using expensive metals such as gallium and germanium.

It would, therefore, be desirable to further increase metal content in a MeAPO molecular sieve without forming undesirable metal islands in order to increase catalytic activity and selectivity.

SUMMARY OF THE INVENTION

In order to overcome many of the problems inherent in the prior art, the present invention provides a method for the synthesis of MeAPO molecular sieves.

The method includes the following steps: providing a source of alumina, a source of phosphorus, water, and a template suitable for forming a MeAPO molecular sieve; providing a source of metal (Me) including metal particles, the metal particles measuring, in their largest dimension, equal to or less than five nanometers; providing a water soluble organic solvent capable of solubilizing the source of metal; forming a synthesis mixture from the source of alumina, the source of phosphorus, the water, the template, the source of metal, and the solvent; and forming a MeAPO molecular sieve from the synthesis mixture. Desirably, the metal is silicon and the MeAPO is a silicoaluminophosphate molecular sieve.

Another embodiment of the present invention is directed to an isocrystalline spheroidal particle comprising a SAPO molecular sieve. The particle measures from 0.5 microns to 30 microns in diameter. The particle further includes crystallites measuring from 0.05 microns to 1 micron at their largest dimension. This particle is desirably made by the process set forth above. Desirably, the particle is a SAPO-34 molecular sieve.

Other advantages and uses of the present invention will become apparent from the following detailed description, appended figures, and appended claims.

DETAILED DESCRIPTION OF THE INVENTION

Figure 1:
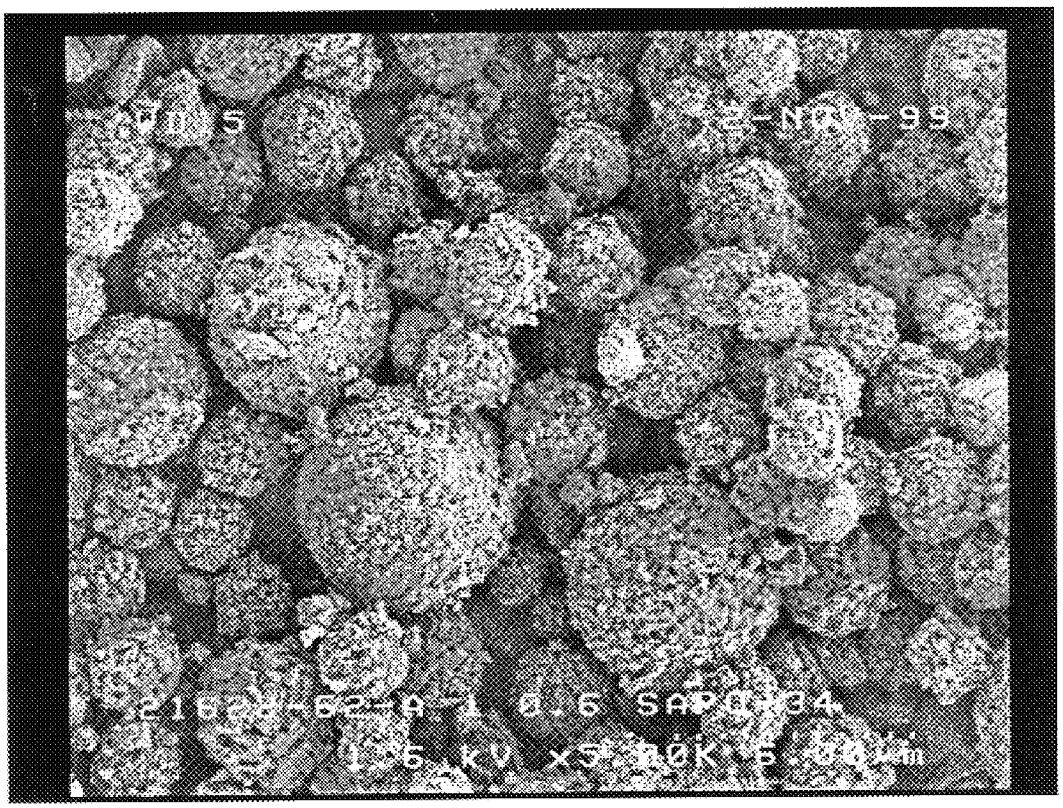
FIG. 1 shows an electron micrograph at 5,000× magnification of another SAPO-34 molecular sieve formed by the process of the present invention.

The metalloaluminophosphate (MeAPO) molecular sieve of this invention comprises a three-dimensional microporous crystal framework structure of $[MeO_2]$, $[AlO_2]$ and $[PO_2]$ tetrahedral units. The MeAPO molecular sieves, made by the processes of the present invention, comprise a molecular framework of corner-sharing $[MeO_2]$, $[AlO_2]_1$, and $[PO_2]$ tetrahedral units. MeAPO molecular sieves are generally classified as being microporous materials having 8, 10, or 12 membered ring structures. Useful metals (Me) are any metal which is capable of being incorporated into the framework of a molecular sieve. Useful metals are selected from the group consisting of boron, beryllium, chromium, cobalt, gallium, germanium, iron, manganese, magnesium, nickel, silicon, vanadium, zinc and combinations thereof.

The MeAPO molecular sieve of the present invention is made by forming a synthesis mixture from a source of alumina, a source of phosphorous, water, a template useful for forming a MeAPO molecular sieve, a source of a metal (Me), and a water soluble organic solvent. The mixture has the formula (I):

$$TEMP:Al_2O_3:P_2O_5:MeO_n:H_2O:SOL \qquad (I)$$

wherein TEMP is the template, SOL is the water soluble organic solvent, and n is dependent upon the charge of the metal.

The template is a structure directing agent. To form MeAPO molecular sieves, these compounds contain elements of Group Va of the Periodic Table of Elements (*Lange's Handbook of Chemistry*, 13th edition, J. A. Dean, ed., McGraw-Hill, New York (1985)), particularly nitrogen, phosphorus, arsenic and antimony, preferably N or P and most preferably N, which compounds also contain at least one alkyl or aryl group having from 1 to 8 carbon atoms. Particularly preferred nitrogen-containing compounds for use as templating agents are the amines and quaternary ammonium compounds, the latter being represented generally by the formula $R_4N^+$ wherein each R is an alkyl or aryl group containing from 1 to 8 carbon atoms. Polymeric quaternary ammonium salts such as $[(C_{14}H_{32}N_2)(OH)_2]_x$ wherein "x" has a value of at least 2 are also suitably employed. Mono-, di and tri-amines are advantageously utilized, either alone or in combination with a quaternary ammonium compound or other templating compound. Mixtures of two or more templating agents can either produce mixtures of the desired MeAPOs or the more strongly directing templating species may control the course of the reaction with the other templating species serving primarily to establish the pH conditions of the reaction mixture.

Representative templates include tetramethylammonium, tetraethylammonium, tetrapropyliam-monium or tetrabutylammonium ions; di-n-propylamine, tripropylamine, triethylamine, triethanolamine; piperidine; cyclohexylamine; 2-methylpyridine; N,N-dimethylbenzylamine; N,N-diethylethanolamine; dicyclohexylamine; N,N-dimethylethanolamine; choline; N,N'-dimethylpiperazine; 1,4-diazabicyclo(2,2,2)octane; N-methyidiethanolamine, N-methylethanolamine; N-methylpiperidine; 3-methylpiperidine; N-methylcyclohexylamine; 3-methylpyridine; 4-methylpyridine; quinuclidine; N,N'-dimethyl-1,4-diazabicyclo(2,2,2)octane ion; di-n-butylamine, neopentylamine; di-n-pentylamine; isopropylamine; t-butylamine; ethylenediamine; pyrrolidine; and 2-imidazolidone. Not every templating agent will direct the formation of every species of MeAPO, i.e., a single templating agent can, with proper manipulation of the reaction conditions, direct the formation of several MeAPO compositions, and a given MeAPO composition can be produced using several different templating agents. Mixtures of two or more templates can produce mixtures of different sieves or predominantly one sieve where one template is more strongly directing than another.

Representative templates for forming a MeAPO-5 molecular sieve include tetraethylammonium hydroxide (TEAOH), tetra-n-propylammonium hydroxide (TPAOH), tri-n-propylamine ($Pr_3N$), tetra-n-butylammonium hydroxide (TBAOH) and diethylethanolamine (DEA).

Representative templates for forming a MeAPO-11 molecular sieve include di-n-propylamine. ($Pr_2NH$); tetra-n-butylammonium hydroxide (TBAOH) and di-n-propylamine ($Pr_2NH$); diisopropylamine (i-$Pr_2NH$) and di-n-propylamine.

A representative template for forming a MeAPO-16 molecular sieve, a MeAPO-17 molecular sieve or a MeAPO-35 molecular sieve is quinuclidine. Another representative template for forming MeAPO-17 is cyclohexylamine (CHA).

Representative templates for forming MeAPO-18 include TEAOH, di-isopropylethylamine and combinations thereof.

Representative templates for forming a MeAPO-20 molecular sieve include tetramethylammonium-hydroxide pentahydrate (TMAOH•$5H_2O$); TEAOH; and pyrrolidine.

A representative template for forming a MeAPO-31 molecular sieve is $Pr_2NH$.

Representative templates for forming a MeAPO-34 molecular sieve include tetraethyl ammonium salts, cyclopentylamine, aminomethyl cyclohexane, piperidine, triethylamine, cyclohexylamine, tri-ethyl hydroxyethylamine, morpholine, dipropylamine (DPA), pyridine, isopropylamine and combinations thereof. Preferred templates are triethylamine, cyclohexylamine, piperidine, pyridine, isopropylamine, tetraethyl ammonium salts, and mixtures thereof. The tetraethylammonium salts include tetraethyl ammonium hydroxide (TEAOH), tetraethyl ammonium phosphate, tetraethyl ammonium fluoride, tetraethyl ammonium bromide, tetraethyl ammonium chloride, tetraethyl ammonium acetate. Preferred tetraethyl ammonium salts are tetraethyl ammonium hydroxide and tetraethyl ammonium phosphate.

Representative templates for forming a MeAPO-37 molecular sieve include TPAOH; and TEAOH and tetrapropylammonium hydroxide.

Representative templates for forming a MeAPO-40 molecular sieve include TPAOH and ammonium acetate ($NH_4OAc$).

Representative templates for forming a MeAPO-41 molecular sieve include TBAOH, diethylamine and dipropylamine.

Representative templates for forming a MeAPO-42 molecular sieve include tetramethylammonium hydroxide pentahydrate (TMAOH-$5H_2O$) and TEAOH.

A representative template for forming a MeAPO-44 molecular sieve is cyclohexylamine.

The source of the metal (Me) may be any source which contains metal particles measuring, in their largest dimension, equal to or less than five nanometers. The source of the metal may be any metal species, for example, the metal may be a cluster of a metal, a complex of a metal, or particle(s) of a metal. It has been found that, through the use of particles measuring, in their largest dimension, equal to or less than five nanometers, more reactive sieves can be formed because the metal is easily and effectively dispersed in the synthesis mixture. Further, as discussed below, these particle sizes can be used to form molecular sieves having novel morphologies. To determine the appropriate size of the metal particles useful in the present invention, the particles may be measured by small angle x-ray scattering which is also known by its acronym as SAXS.

The source of the metal may be a monomeric metal compound, an oligomeric metal compound containing particles measuring equal to or less than five nanometers, and/or metal particles which measure equal to or less than five nanometers. As used herein, the term "monomeric" means each metal atom is not chemically, either directly or indirectly, bonded to another metal atom. As used herein, the term "oligomeric" connotes a metal species which contains no more than six of the desired metal ions directly or indirectly chemically bonded to each other. Non-limiting examples of useful metals include one or more of tetraalkylorthometallates, such as tetramethylorthometallate, tetraethylorthometallate, tetrapropylorthometallate, and tetrabutylorthometallate; colloidal metals; and metal sols. Desirably, the source of the metal is a tetraalkylorthometallate. SOL is a water soluble organic solvent capable of solubilizing the source of the metal. Desirably, the solvent is selected from the group consisting of sulfoxides and $C_1$ to $C_5$ oxygenated hydrocarbons. Desirably, the oxygenated hydrocarbon is selected from the group consisting of alcohols (branched or normal), ketones, aldehydes, diols and acids. Useful solvents include one or more solvents selected from the group consisting of acetone, 1,2-propanediol, 1,3-propanediol, methanol, ethanol, propanol, isopropanol, butanol, and ethylene glycol. Desirably, the solvent is an alcohol.

The source of alumina may be any aluminum species capable of being dispersed or dissolved in an aqueous synthesis solution. Useful sources of alumina are one or more sources selected from the group consisting of the following: hydrated alumina, organo alumina, psuedoboehmite, aluminum hydroxide, colloidal alumina, and mixtures thereof.

The source of phosphorous is one or more sources selected from the group consisting of phosphoric acid; organic phosphates, such as triethyl phosphate, tetraethylammonium phosphate; aluminophosphates; and mixtures thereof. The phosphorous source should also be capable of being dispersed or dissolved in an aqueous synthesis solution.

The water used can be from any water source and is desirably deionized.

The synthesis mixture of formula (I) may optionally include a morphology modifying agent (MMA). The MMA can be provided to affect the morphology of the resulting molecular sieve particles. Useful MMAs include surfactants; divalent cations of alkali earth metals and/or transition metals; trivalent cations; seeds of MeAPO molecular sieves; and recycled synthesis mixture mother liquor. The MMA is preferably a surfactant.

Useful surfactants include one or more of the following surfactants selected from the group consisting of: long chain alkylamines, such as hexadecylamine, tetradecylamine, dodecylamine, decylamine, or octylamine; dimethyl alkylamine compounds, such as dimethylhexadecylammine or dimethyloctylamine; and trimethylalkylammonium salts, such as trimethylhexadecylammounium chloride.

An aluminophosphate (ALPO) molecular sieve structure can also be formed as an intergrowth of the MeAPO molecular sieves or physically mixed with the MeAPO. Aluminophosphate molecular sieves are crystalline microporous oxides which can have an $AlPO_4$ framework. They can have additional elements within the framework, typically have uniform pore dimensions ranging from about 3 angstroms to about 10 angstroms, and are capable of making size selective separations of molecular species. More than two dozen structure types have been reported, including zeolite topological analogues. Preferred ALPO structures are ALPO-5, ALPO-11, ALPO-18, ALPO-31, ALPO-34, ALPO-36, ALPO-37, and ALPO-46.

The MeAPO synthesis mixture of formula (I) is formed by combining the source of phosphorus, water, the source of alumina, the solvent, the source of the metal and a template in a reaction vessel. No particular order of mixing the components is required, however, it is desired that the phosphorus source and water be combined prior to the addition of the other components.

In a desired embodiment, the source of phosphorus, water and the source of alumina are first mixed in a reaction vessel. Next, the template required to form the desired MeAPO is added to the reaction vessel and the solution is stirred. Then, the solvent, the MMA if employed, and the source of the metal are added to the reaction vessel.

After the synthesis mixture is formed, it is mixed for a period of time from about 1 minute to about 480 minutes. Desirably, the synthesis solution is mixed for a period of time sufficient to form a gel or slurry which has a homogenous appearance.

The reaction vessel containing the synthesis mixture is sealed and heated, desirably under autogenous pressure, to a temperature of at least 80° C., desirably from about 100° C. to about 250° C., until a crystalline product is formed. Low temperature and short crystallization times are preferred because those conditions may prevent the formation of undesirable products. The mixture is crystallized at a pressure of from about 0 bar to about 70 bar. Formation of the crystalline product can take anywhere from around 1 minute to as much as 2 weeks. In some cases, stirring or seeding with crystalline or colloidal material will facilitate the formation of the product. The mixture may be heated in a convection oven, an externally heated autoclave, a microwave autoclave or any other apparatus currently used in the art to heat such mixtures.

Because the MeAPO molecular sieve product is formed in solution, it can be recovered by standard means, such as by centrifugation or filtration. The process may also include conventional product washing and drying such as by an ethanol rinse and/or a water rinse, with either or both of the rinses being conducted a plurality of times. The product may then be dried by any conventional drying technique. Typically, the drying is conducted in a convection oven at a temperature from about ambient temperature to about 200° C. The drying may also be conducted in an externally heated autoclave or a microwave autoclave.

The process of the present invention is particularly useful for forming a silicoaluminophosphate molecular sieve. The process of the present invention can be used to form a silicoaluminophosphate molecular sieve selected from the group consisting of SAPO-5, SAPO-11, SAPO-16, SAPO-17, SAPO-18, SAPO-20, SAPO-31, SAPO-34, SAPO-37, SAPO-40, SAPO-41, SAPO-42, SAPO-44 and SAPO-47. Desirably, the process of the present invention is used to formulate SAPO-34.

The SAPO molecular sieve of the present invention is made by forming a synthesis mixture from a source of alumina, a source of phosphorous, water, a template capable of forming a SAPO molecular sieve, a source of a silicon, and a water soluble organic solvent. The mixture has the formula (II):

$$X_1TEMP:X_2Al_2O_3:X_3P_2O_5:X_4SiO_2:X_5H_2O:X_6SOL \qquad (II)$$

wherein TEMP is the template and SOL is the water soluble organic solvent. The components are as listed above in the discussion of the MeAPO embodiment.

When a SAPO is formed by the process of the present invention, the source of silicon may be any silicon species capable of being dispersed or dissolved in an aqueous synthesis solution. As stated above in regard to the metal, the source of silicon is any source which contains silicon particles measuring, in their largest dimension, equal to or less than five nanometers. The source of the silica may be any metal species, for example a cluster of silica, a complex of silica, or particles of silica. The source of the silica may be a monomeric silicon, an oligomeric silicon compound measuring equal to or less than five nanometers, and/or silicon particles which measure equal to or less than five nanometers. In this context, the term "monomeric" means each silicon atom is not chemically, either directly or indirectly, bonded to another silicon atom. As also used in this context, the term "oligomeric" connotes a silicon species which contains no more than six silicon ions directly or indirectly chemically bonded to each other. Non-limiting examples of useful silicon source materials include one or more of tetraalkylorthosilicates, such as tetramethylorthosilicate, tetraethylorthosilicate (TEOS), tetrapropylorthosilicate, and tetrabutylorthosilicate; colloidal silica; fumed silica; and silica sols.

The silicoaluminophosphate mixture of formula (II) may be formed in accordance with the previously described processes.

In either of the embodiments described above, the resulting synthesis solution has a TEMP:$Al_2O_3$ molar ratio of from about 0.1 to about 5, and more desirably from about 0.5 to about 3. The SOL:$Al_2O_3$ molar ratio in the synthesis solution is desirably from about 0 to about 30, and more desirably from about 4 to about 20, and the $SiO_2$:$Al_2O_3$ molar ratio is desirably from about 0.01 to about 2.0, and is more desirably from about 0.1 to about 0.8. The $P_2O_5$:$Al_2O_3$ molar ratio in the synthesis solution is desirably from about 0.5 to 1.5 and more desirably from about 0.8 to 1.1. If a MMA is used in this embodiment, then the resulting solution will have a MMA: $Al_2O_3$ molar ratio of from about 0.01 to about 0.5, and more desirably from about 0.05 to about 0.3.

The silicoaluminophosphate molecular sieve of this invention comprises a three-dimensional microporous crystal framework structure of $[SiO_2]$, $[AlO_2]$ and $[PO_2]$ tetrahedral units. The way Si is incorporated into the structure can be determined by $^{29}Si$ MAS NMR. See Blackwell and Patton, J. Phys. Chem., 92, 3965 (1988). The desired SAPO molecular sieves exhibit one or more peaks in the $^{29}Si$ MAS NMR, with a chemical shift $\delta(Si)$] in the range of –88 to –96 ppm and with a combined peak area in that range of at least 20% of the total peak area of all peaks with a chemical shift $\delta(Si)$] in the range of –88 ppm to –115 ppm, where the $\delta$(Si)] chemical shifts refer to external tetramethylsilane (TMS).

Figure 2:
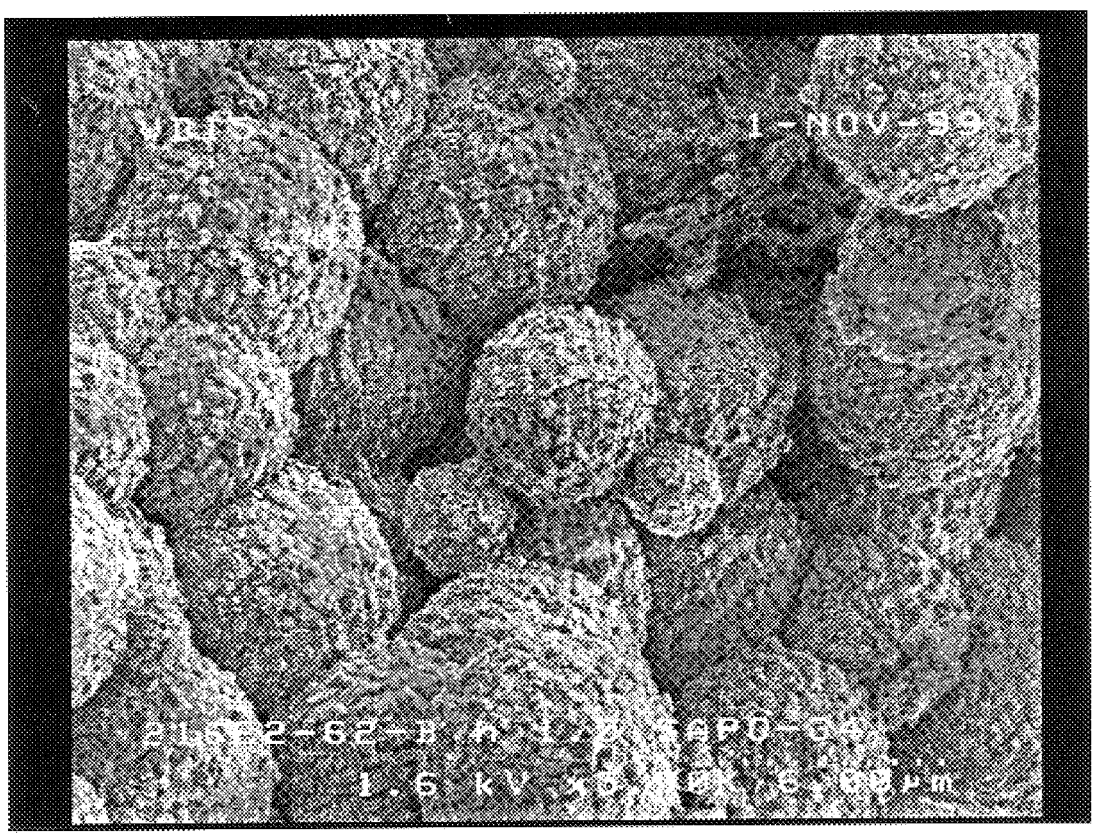
FIG. 2 shows an electron micrograph at 5,000× magnification of another SAPO-34 molecular sieve formed by the process of the present invention.
Figure 3:
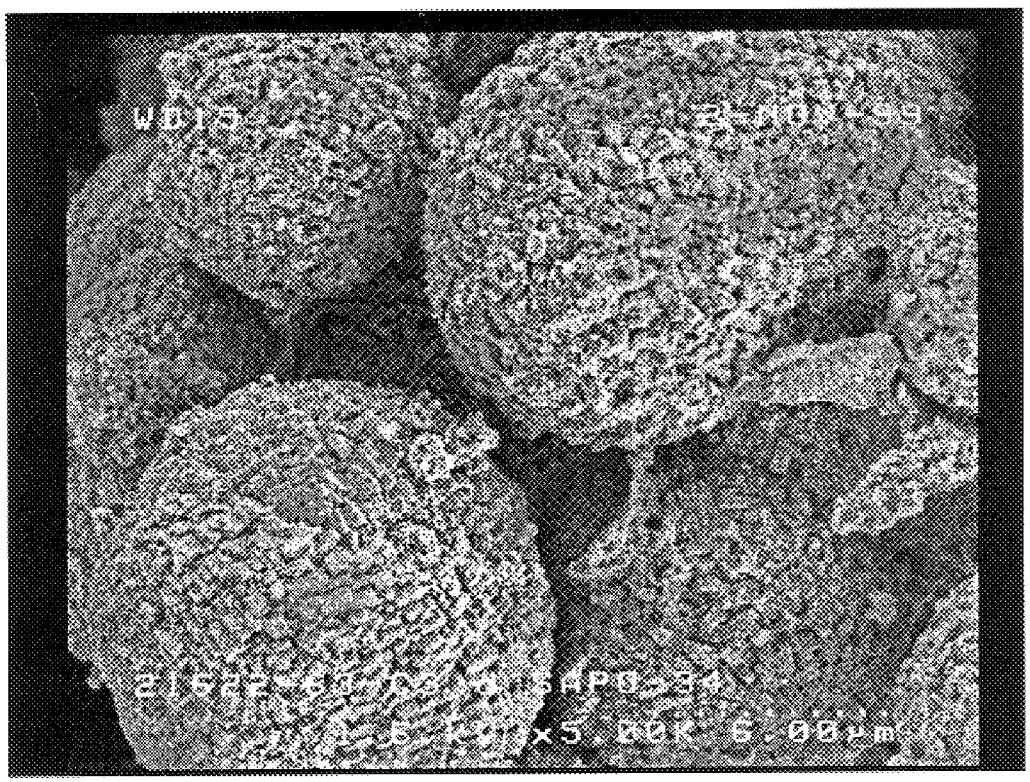
FIG. 3 shows an electron micrograph at 5,000× magnification of another SAPO-34 molecular sieve formed by the process of the present invention.

In a desired embodiment of the invention, the process described above forms a SAPO-34 molecular sieve having a novel crystal morphology. This morphology is shown in FIGS. 1–3. This morphology is described as being an isocrystalline spheroidal particle comprising a silicoaluminophosphate molecular sieve. As used herein, the term "spheroidal" means a body that is shaped like a sphere but is not necessarily perfectly round. As also used herein, the term "isocrystalline" describes a non-formulated particle having a textured surface formed by crystallites smaller than the non-formulated particle. The crystallites have the same composition as the non-formulated particle. By "nonformulated," it is meant that the particle is not a physical agglomeration formed by combining molecular sieve particles or complexes with binders and/or fillers or by external forming devices, such as extruders. The particle itself has a diameter of from about $0.5\mu$ to about $30\mu$. The crystallites have a width, at their largest dimension, of from about $0.05\mu$ to about $2.5\mu$. The diameter of the particle and the size of the crystallites can be determined by scanning electron microscopy (SEM).

The spheroidal particle is desirably formed in the following manner. First, the source of phosphorous, water and the source of aluminum are mixed, desirably in the listed order, in a reaction vessel. Next, the template is added to the reaction mixture and stirred. The solvent, morphology modifying agent, and the source of silica are added to the mixture. The reaction is then mixed until a synthesis mixture having the appearance of a homogenous gel or slurry is formed. The synthesis mixture is then heated to form the molecular sieve crystals. After heating, the molecular sieve crystals are recovered by centrifugation followed by an ethanol wash, repeated twice, and a deionized water wash, also performed twice. Finally, the crystals are dried. Examples of this process are presented below in Examples 1–3.

It has been found that by varying the concentration of silicon in the synthesis mixture, the size of the spheroidal particle can be adjusted. As the concentration of silicon in the synthesis mixture increases, the diameter of the spheroidal particle will also increase. Similarly, a decrease in the silicon content of the reaction mixture produces a decrease in the diameter of the spheroidal particle.

This invention will be better understood with reference to the following examples, which are intended to illustrate specific embodiments within the overall scope of the invention as claimed and which are intended to be nonlimiting.

EXAMPLE 1

Preparation of Spheroidal SAPO-34

A silicoaluminophosphate synthesis mixture was prepared having the stoichiometry:

0.16MMA: 2 TEMP: $Al_2O_3$: $P_2O_5$: 0.6 $SiO_2$: 50 $H_2O$: 8 SOL in which MMA is hexadecylamine ($C_{16}NH_2$), TEMP is tetraethylammonium hydroxide (TEAOH), and SOL is ethanol. The synthesis mixture was formed by mixing together 9.4 g of $H_3PO_4$(85%), 9.3 g of deionized water, and 5.60 g of hydrated alumina (Vista Chemical, Catapal B) in a plastic beaker for one minute. The resulting mixture was allowed to age for five minutes and then mixed for one more minute. To this mixture was added 34.2 g of 35% aqueous TEAOH (SACHEM) and the mixture then stirred for two minutes. Then 15.0 g of absolute ethanol, 1.57 g of hexdecylamine and 5.1 g of tetraethylorthosilicate were mixed in. The mixture was mixed for one minute, transferred to a Waring blender and thoroughly homogenized for 5 minutes and then placed in a 125 ml. teflon lined autoclave (PARR). The autoclave was placed in a 200° C. oven for 24.5 hours. The product was recovered by centrifugation, reslurried twice with a 50:50 mixture of ethanol and water, and then twice with water. The product was dried in a convection oven at 115° C. Powder X-ray diffraction showed the product to be SAPO-34. Elemental analysis by ICPES gave 5.63% Si, 16.88% Al, and 13.22% P which represents a product stoichiometry of $Si_{.16}$, $Al_{.199}$, $P_{.341}$. Scanning electron microscopy showed spheroidal isocrystalline particles having a particle size of 2–5 $\mu$m. These particles are shown in FIG. 1.

EXAMPLE 2

Preparation of Spheroidal SAPO-34

A silicoaluminophosphate synthesis mixture was prepared having the stoichiometry:

0.16MMA: 2 TEMP: $Al_2O_3$: $P_2O_5$: 1.0 $SiO_2$: 50 $H_2O$: 8 SOL in which MMA was hexadecylamine, TEMP was tetraethylammonium hydroxide and SOL was ethanol. The synthesis mixture was formed by mixing together 9.0 g of $H_3PO_4$ (85%), 8.9 g of deionized water, and 5.37 g of hydrated alumina(Vista Chemical, Catapal B) in a plastic beaker for one minute. The resulting mixture was allowed to age for five minutes and then mixed for one minute. To this mixture was added 32.8 g of 35% aqueous TEAOH (SACHEM) and the mixture was then stirred for two minutes. Then 14.4 g of absolute ethanol, 1.50 g of hexdecylamine and 8.1 g of tetraethylorthosilicate were mixed in. The mixture was mixed for one minute, transferred to a Waring blender and thoroughly homogenized for 5 minutes and then placed in a 125 ml. teflon lined autoclave (PARR). The autoclave was placed in a 200° C. oven for 24.5 hours. The product was recovered by centrifugation, reslurried twice with a 50:50 mixture of ethanol and water, and then twice with water. The product was dried in a convection oven at 115° C. Powder X-ray diffraction showed the product to be SAPO-34. Elemental analysis by ICPES gave 7.23% Si, 14.67% Al, and 12.64% P which represents a product stoichiometry of $Si_{.213}$, $Al_{.45}$, $P_{.338}$. Scanning electron microscopy showed the majority of the product to comprise spheroidal isocrystalline particles having a particle size of 36 μm. These particles are shown in FIG. 2.

EXAMPLE 3

Preparation of Spheroidal SAPO-34

A silicoaluminophosphate synthesis mixture was prepared having the stoichiometry:

0.16 MMA: 2 TEMP: $Al_2O_3$: $P_2O_5$: 1.5 $SiO_2$: 50 $H_2O$: 8 SOL in which MMA was hexdecylamine, TEMP was tetraethylammonium hydroxide, and SOL was ethanol. The synthesis mixture was formed by mixing together 8.5 g of $H_3PO_4$ (85%), 8.5 g of deionized water, and 5.11 g of hydrated alumina (Vista Chemical, Catapal B) in a plastic beaker for one minute. The resulting mixture was allowed to age for five minutes and mixed for one minute. To this mixture was added 31.5 g of 35% aqueous TEAOH (SACHEM) and the mixture was then stirred for two minutes. Then 13.7 g of absolute ethanol, 1.43 g of hexdecylamine and 11.6 g of tetraethylorthosilicate were mixed in. The mixture was mixed for one minute, transferred to a Waring blender and thoroughly homogenized for 5 minutes and then placed in a 125 ml. teflon lined autoclave (PARR). The autoclave was placed in a 200° C. oven for 5 days. The product was recovered by centrifugation, reslurried twice with a 50:50 mixture of ethanol and water, and then twice with water. The product was dried in a convection oven at 115° C. Powder X-ray diffraction showed the product to be SAPO-34. Scanning electron microscopy showed the majority of the product to comprise spheroidal isocrystalline particles having a particle size of 8–12 μm. These particles are shown in FIG. 3.

EXAMPLE 4

Preparation of SAPO-18

A silicoaluminophosphate synthesis mixture was prepared having the stoichiometry:

2 TEMP: $Al_2O_3$: $P_2O_5$: 0.1 $SiO_2$: 50 $H_2O$: 8 SOL

In which TEMP was tetraethylammonium hydroxide and SOL was ethanol. The synthesis mixture was formed by mixing together 19.8 g of $H_3PO_4$(85%), 15 g of deionized water, and 11.8 g of hydrated alumina(Vista Chemical, Catapal B) in a plastic beaker for two minutes. The resulting mixture was allowed to age for five minutes. To this mixture was added 72.1 g of 35% aqueous TEAOH (SACHEM) and the mixture then stirred for two minutes. Then 31.6 g of absolute ethanol and 1.8 g of tetraethylorthosilicate were mixed in. The mixture was mixed for two minutes, transferred to a Waring blender and thoroughly homogenized for 5 minutes and then placed in a 125 ml. teflon lined autoclave (PARR). The autoclave was placed in a 200° C. oven for 24 hours. The product was recovered by centrifugation, reslurried once with a 50:50 mixture of EtOH and water, and then once with water. The product was dried in an 115° C. oven. Powder X-ray diffraction showed the product to be SAPO-18. Elemental analysis by ICPES gave 0.512% Si, 17.67% Al, and 19.35% P which represents a product stoichiometry of $Si_{.014}$, $Al_{.505}$, $P_{.481}$.

EXAMPLE

Preparation of SAPO-35

A silicoaluminophosphate synthesis mixture was prepared having the stoichiometry:

0.16 MMA: 2 TEMP: $Al_2O_3$: $P_2O_5$: 0.3 $SiO_2$: 50 $H_2O$: 8 SOL which MMA was hexadecylamine, TEMP was triethylmethylammonium hydroxide and SOL was ethanol. The synthesis mixture was formed by, mixing together 21.7 g of $H_3PO_4$(85%), 18.5 g of deionized water, and 3.0 g of hydrated alumina (Vista Chemical, Catapal B) in a plastic beaker for one minute. The resulting mixture was allowed to age for five minutes. To this mixture was added 62.7 g of 40% aqueous triethylmethylammonium hydroxide (SACHEM) and the mixture then stirred for one minute. Then 34.7 g of absolute ethanol and 5.9 g of tetraethylorthosilicate were mixed in. To one half of the mixture (78.2 g) was added 1.82 g of hexadecylamine The mixture was transferred to a Waring blender and thoroughly homogenized for 5 minutes and then placed in a 125 ml. teflon lined autoclave (PARR). The autoclave was placed in a 200° C. oven for 3 days. The product was recovered by centrifugation, reslurried twice with a 50:50 mixture of ethanol and water, and then twice with water. The product was dried in an 115° C. oven. Powder X-ray diffraction showed the product to be SAPO-35. Elemental analysis by ICPES gave 2.80% Si, 17.27% Al, and 16.46% P which represents a product stoichiometry of $Si_{.078}Al_{.503}P_{.418}$.

EXAMPLE 6

Preparation of SAPO-41

A silicoaluminophosphate synthesis mixture was prepared having the stoichiometry:

TEMP: $Al_2O_3$: $P_2O_5$: 0.4 $SiO_2$: 40 $H_2O$: 8 SOL in which TEMP is diethylamine and SOL is ethanol. The synthesis mixture was formed by mixing together 23.2 g of $H_3PO_4$(85%), 36.8 g of deionized water, and 13.9 g of hydrated alumina (Vista Chemical, Catapal A) in a plastic beaker for one minute. The resulting mixture was allowed to age for five minutes and then mixed for one minute. To this mixture was added 7.4 g of diethylamine and the mixture then stirred for two minutes after which the evaporated amine template was replenished. Then 17.7 g of absolute ethanol, 8.4 g of tetraethylorthosilicate, and 23.2 g of deionized water were mixed in. The mixture was transferred to a Waring blender and thoroughly homogenized for 5 minutes and then placed in two 125 ml. teflon lined autoclaves (PARR). One autoclave was placed in a 175° C. oven for 16 hours. The product was recovered by centrifugation, reslurried twice with a 50:50 mixture of ethanol and water, and then twice with water. The product was dried in an 115° C. oven. Powder X-ray diffraction showed the product to be SAPO-41. Elemental analysis by ICPES gave 1.29% Si, 18.75% Al, and 20.75% P which represents a product stoichiometry of $Si_{.041}Al_{.499}P_{.460}$.

EXAMPLE 7

Preparation of SAPO-41

A silicoaluminophosphate synthesis mixture was prepared having the stoichiometry:

3 TEMP: $Al_2O_3$: $P_2O_5$: 0.2 $SiO_2$: 45 $H_2O$: 4 SOL in which TEMP was dipropylamine and SOL was ethanol. The synthesis mixture was formed by mixing together 11.7 g of $H_3PO_4$(85%), 18.3 g of deionized water, and 6.97 g of hydrated alumina (Vista Chemical, Catapal B) in a plastic beaker for two minutes. The resulting mixture was allowed to age for five minutes. To this mixture was added 15.3 g of dipropylamine and the mixture then stirred for two minutes after which the evaporated amine template was replenished. Then 9.3 g of absolute ethanol, 60 mg. of SAPO-41 seeds, 2.1 g of tetraethylorthosilicate and 16.4 g of deionized water were mixed in for one minute. The mixture was transferred to a Waring blender and thoroughly homogenized for 5 minutes and then placed in a 1.25 ml. teflon lined autoclave (PARR). The autoclave was placed in a 175° C. oven for 24.5 hours. The product was recovered by centrifugation, reslurried twice with a 50:50 mixture of EtOH and water, and then twice with water. The product was dried in an 115° C. oven. Powder X-ray diffraction showed the product to be SAPO-41. Elemental analysis by ICPES gave 1.807% Si, 19.45% Al, and 20.4% P which represents a product stoichiometry of $Si_{.045}Al_{.499}P_{.456}$.

EXAMPLE 8

Preparation of GeAPO-41

A silicoaluminophosphate synthesis mixture was prepared having the stoichiometry:

0.16 MMA: 2 TEMP: $Al_2O_3$: $P_2O_5$: 0.4 $GeO_2$: 40 $H_2O$: 8 SOL in which MMA was hexadecylamine, TEMP was dipropylamine and SOL was ethanol. The synthesis mixture was formed by mixing together 11.4 g of $H_3PO_4$ (85%), 20 g of deionized water, and 6.83 g of hydrated alumina (Vista Chemical, Catapal B) in a plastic beaker for two minutes. The resulting mixture was allowed to age for five minutes. To this mixture was added 10.0 g of dipropylamine and the mixture then stirred for two minutes after which the evaporated amine template was replenished. Then 18.2 g of absolute ethanol, 1.91 g of hexadecylamine, 9.5 g of deionized water, and 5.0 g of tetraethylorthogermanate were mixed in. The mixture was mixed for one minute, transferred to a Waring blender and thoroughly homogenized for 5 minutes and then placed in a 125 ml. teflon lined autoclave (PARR). The autoclave was placed in a 200° C. oven for 24 hours. The product was recovered by centrifugation, reslurried twice with a 50:50 mixture of ethanol and water, and then twice with water. The product was dried in an 115° C. oven. Powder X-ray diffraction showed the product to be GeAPO-41. Elemental analysis by ICPES gave 6.53% Ge, 16.47% Al, and 15.01% P which represents a product stoichiometry of $Ge_{.076}Al_{.515}P_{.409}$.

As a result of the crystallization processes described above and demonstrated in the examples, the recovered MeAPO molecular sieve may contain within its pores at least a portion of the template used in making the initial reaction mixture. The crystalline structure encompasses the template, and the template must be removed so that the molecular sieve can exhibit catalytic activity. Once the template is removed, the crystalline structure that remains has what is conventionally referred to as an intracrystalline pore system. As an additional step, the processes of this invention may also include the step of removing the template from the molecular sieve.

In many cases, depending upon the nature of the final product formed, the template may be too large to move freely through the intracrystalline pore system. In such a case, the template can be removed by a heat treatment process. For example, the template can be calcined, or essentially combusted, in the presence of an oxygen-containing gas, by contacting the template-containing sieve in the presence of the oxygen-containing gas and heating at temperatures from 200° C. to 900° C. In some cases, it may be desirable to heat in an environment having a low oxygen concentration. In these cases, however, the result will typically be a breakdown of the template into a smaller component, rather than by the combustion process. This type of process can be used for partial or complete removal of the template from the intracrystalline pore system. In other cases, with smaller templates, complete or partial removal from the sieve can be accomplished by conventional desorption processes such as those used in making standard zeolites.

As another additional step to the processes of the present invention, the processes may include the step of admixing the molecular sieve with additional materials. When blended, the resulting composition is typically referred to as a formulated catalyst, with the formulated catalyst comprising the MeAPO molecular sieve.

Materials which can be blended with the molecular sieve can be various inert or catalytically active materials, or various binder materials. These materials include compositions such as kaolin and other clays, various forms of rare earth metals, other non-zeolite catalyst components, zeolite catalyst components, alumina or alumina sol, titania, zirconia, quartz, silica or silica or silica sol, and mixtures thereof. These components are also effective in reducing overall catalyst cost, acting as a thermal sink to assist in heat shielding the catalyst during regeneration, densifying the catalyst and increasing catalyst strength. The amount of molecular sieve which is contained in the final molecular sieve catalyst product ranges from 10 to 90 weight percent of the total catalyst, desirably 30 to 70 weight percent of the total catalyst.

Additional molecular sieve materials can be mixed with the MeAPO catalyst if desired. Molecular sieves that are suitable for use in this invention include AEI, AFT, APC, ATN, ATT, ATV, AWW, BIK, CAS, CHA, CHI, DAC, DDR, EDI, ERI, GOO, KFI, LEV, LOV, LTA, MON, PAU, PHI, RHO, ROG, THO, MFI, MEL, MTW, EUO, MTT, HEU, FER, AFO, AEL, TON, and substituted forms thereof. These molecular sieves are described in greater detail in the Atlas of Zeolite Structural Types, W. M. Meier and D. H. Olsen, Butterworth Heineman, 3rd ed., 1997, the detailed description of which is explicitly incorporated herein by reference. Preferred molecular sieves which can be combined with the MeAPO include AEI, ERI and CHA type zeolites.

Persons of ordinary skill in the art will recognize that many modifications may be made to the present invention without departing from the spirit and scope of the present invention. The embodiment described herein is meant to be illustrative only and should not be taken as limiting the invention, which is defined by the following claims.

What is claimed is:

1. A method for making a metalloaluminophosphate (MeAPO) molecular sieve, said process comprising the steps of:

providing a source of alumina, a source of phosphorus, water, and a template suitable for forming a MeAPO molecular sieve;

providing a source of metal including metal particles, said metal particles measuring, in their largest dimension, equal to or less than five nanometers;

providing a water soluble organic solvent capable of solubilizing said source of metal;

forming a synthesis mixture from said source of alumina, said source of phosphorus, said water, said template, said source of metal, and said solvent; and forming a MeAPO molecular sieve from said synthesis mixture.

2. The method of claim 1 wherein said source of metal is selected from the group consisting of boron, beryllium, cobalt, gallium, germanium, iron, manganese, magnesium, nickel, silicon, vanadium, zinc and combinations thereof.

3. The method of claim 2 wherein said source of metal is selected from the group consisting of monomeric metal compound; oligomeric metal compounds containing metal particles measuring, in their largest-dimension, equal to or less than five nanometers; and mixtures thereof.

4. The method of claim 3 wherein said source of metal is monomeric metal compound.

5. The method of claim 2 wherein said source of metal is selected from the group consisting of tetraalkylorthometallates, colloidal metals, and metal sols.

6. The method of claim 5 wherein said source of metal is a tetraalkylorthometallate.

7. The method of claim 1 wherein said template is selected from the group consisting of tetraethylammonium hydroxide (TEAOH), tetra-n-propyl-ammonium hydroxide (TPAOH), tri-n-propylamine ($Pr_3N$), tetra-n-butylammonium hydroxide (TBAOH) and diethylethanolamine (DEA).

8. The method of claim 7 wherein said MeAPO is MeAPO-5.

9. The method of claim 1 wherein said template is selected from the group consisting of di-n-propylamine ($Pr_2NH$), tetra-n-butylammonium hydroxide (TBAOH) and $Pr_2NH$, diisopropylamine (i-$Pr_2NH$), di-n-propylamine, n-butylethylamine, di-n-butylamine, and di-n-pentylamine.

10. The method of claim 9 wherein said MeAPO is MeAPO-11.

11. The method of claim 1 wherein said template is selected from the group consisting of tetraethylammonium hydroxide, di-isopropylethylamine and combinations thereof.

12. The method of claim 11 wherein said MeAPO is MeAPO-18.

13. The method of claim 1 wherein said template is selected from the group consisting of tetramethylammonium-hydroxide pentahydrate (TMAOH•$5H_2O$), tetraethylammonium hydroxide, and pyrrolidine.

14. The method of claim 13 wherein said MeAPO is MeAPO-20.

15. The method of claim 1 wherein said template is di-n-propylamine and said MeAPO is MeAPO-31.

16. The method of claim 1 wherein said template is selected from the group consisting of tetraethyl ammonium salts, cyclopentylamine, aminomethyl cyclohexane, piperidine, triethylamine, cyclohexylamine, triethyl hydroxyethylamine, morpholine, dipropylamine (DPA), pyridine, isopropylamine and combinations thereof.

17. The method of claim 16 wherein said MeAPO is MeAPO-34.

18. The method of claim 1 wherein said template is selected from the group consisting of tetramethylammonium hydroxide and tetrapropylammonium hydroxide.

19. The method of claim 18 wherein said MeAPO is MeAPO-37.

20. The method of claim 1 wherein said template is selected from the group consisting of tetrabutylammonium hydroxide, diethylamine and dipropylamine.

21. The method of claim 20 wherein said MeAPO is MeAPO-41.

22. The method of claim 1 wherein said template is selected from the group consisting of tetramethylammonium hydroxide pentahydrate (TMAOH•$5H_2O$) and tetraethylammonium hydroxide.

23. The method of claim 22 wherein said MeAPO is MeAPO-42.

24. The method of claim 1 wherein said template is cyclohexylamine and said MeAPO is MeAPO-44.

25. The method of claim 1 further including the step of providing a morphology modifying agent to said synthesis mixture.

26. The method of claim 25 wherein said morphology modifying agent is selected from the group consisting of a surfactant, divalent cations of alkali earth metals, divalent cations of transition metals, trivalent cations, seeds of molecular sieves, and recycled synthesis mixture.

27. The method of claim 26 wherein the morphology modifying agent is one or more surfactants selected from the group consisting of long chain alkylamines, dimethyl alkylamine compounds, and trimethylalkylammonium salts.

28. The method of claim 27 wherein the morphology modifying agent is one or more long chain alkylamines selected from the group consisting of hexadecylamine, tetradecylamine, dodecylamine, decylamine and octylamine.

29. The method of claim 27 wherein the morphology modifying agent is one or more dimethyl alkylamine compounds selected from the group consisting of dimethylhexadecylamine and dimethyloctylamine.

30. The method of claim 27 wherein the morphology modifying agent is trimethylhexadecylammonium chloride.

31. The method of claim 1 wherein said water soluble organic solvent is selected from the group consisting of sulfoxides and $C_1$ to $C_5$ oxygenated hydrocarbons.

32. The method of claim 28 wherein said water soluble organic solvent is an oxygenated hydrocarbon selected from the group consisting of alcohols, ketones, aldehydes, diols, and acids.

33. The method of claim 29 wherein said water soluble organic solvent is an alcohol.

34. The method of claim 2 wherein said MeAPO molecular sieve is a SAPO molecular sieve.

35. The method of claim 34 where said SAPO is selected from the group consisting of SAPO-5, SAPO-11, SAPO-16, SAPO-17, SAPO-18, SAPO-20, SAPO-31, SAPO-34, SAPO-37, SAPO-40, SAPO-41, SAPO-42, SAPO-44, and SAPO-47.

36. The method of claim 35 wherein said SAPO is SAPO-34.

37. The method of claim 34 wherein said source of said metal is selected from the group consisting of tetraalkylorthosilicates, colloidal silica, fumed silica, and silica sols.

38. The method of claim 37 wherein said source of said metal is TEOS.

* * * * *